United States Patent [19]

Greenberg et al.

[11] Patent Number: 5,217,623
[45] Date of Patent: Jun. 8, 1993

[54] METHOD OF DETOXIFYING CYANIDE WASTE

[75] Inventors: Michael J. Greenberg, Northbrook, Ill.; Roy L. Whistler, West LaFayette, Ind.

[73] Assignee: Northwestern Flavors, Inc., West Chicago, Ill.

[21] Appl. No.: 708,664

[22] Filed: May 30, 1991

[51] Int. Cl.$^5$ .................................................. C02F 1/58
[52] U.S. Cl. ....................................... 210/749; 210/766; 210/904
[58] Field of Search ............... 210/719, 721, 749, 757, 210/758, 763, 766, 904

[56] References Cited

U.S. PATENT DOCUMENTS

| | | | |
|---|---|---|---|
| 3,730,192 | 5/1973 | Gilbert et al. | 210/749 |
| 4,071,448 | 1/1978 | Watanabe et al. | 210/904 |
| 4,731,232 | 3/1988 | Fischer et al. | 423/236 |
| 4,790,940 | 12/1988 | Castaldi et al. | 210/904 |
| 4,802,995 | 2/1989 | Dvorscek et al. | 210/766 |
| 4,812,243 | 3/1989 | Brandenburg et al. | 210/904 |
| 4,877,519 | 10/1989 | Robey | 21/904 |

FOREIGN PATENT DOCUMENTS 1293195 11/1989 Japan .
1468871 3/1989 U.S.S.R. .

OTHER PUBLICATIONS

Blazer et al., *J. Am. Chem. Soc.*, 102:5082–5085 (1980).
Serianni et al., *Carbohydrate Research*, 72:71–78 (1979).
Serianni et al., *J. Org. Chem.*, 45:3329–3341 (1980).
Varma et al., *Carbohydrate Research*, 25:71–79 (1972).

*Primary Examiner*—Thomas Wyse
*Attorney, Agent, or Firm*—Willian Brinks Olds Hofer Gilson & Lione

[57] ABSTRACT

A method for detoxifying cyanide waste using a reactive sugar having aldose functionality is provided. The reactive sugar is mixed with the cyanide waste to produce sugar acid, a non-toxic and environmentally safe compound.

2 Claims, No Drawings

METHOD OF DETOXIFYING CYANIDE WASTE

FIELD OF THE INVENTION

The present invention relates to a method of detoxifying cyanide waste. More particularly, the present invention relates to a method of combining a reactive sugar with cyanide waste to produce a non-toxic, environmentally safe waste material.

BACKGROUND OF THE INVENTION

Cyanide is an extremely toxic chemical. It is used in many industries, including metallurgy, automobile manufacturing, and wood working. Specifically, cyanide is a critical chemical for use in electroplating, coal conversion, and iron ore separation. Various cyanide salts are produced as by-products in these reactions, including sodium cyanide, potassium cyanide, and calcium cyanide.

The waste material generated from such processes is extremely dangerous due to the presence of cyanide and cyanide salts. Consequently, the storage, transport, and disposal of this cyanide waste presents serious hazards to persons handling the waste and to the environment.

Existing methods for treating cyanide waste include wet oxidation and chemical or heat treatment. For example, Brandenburg et al. (U.S. Pat. No. 4,812,243) discloses a method for operating a continuous wet oxidation system for destroying cyanide in caustic cyanide and metal wastes which scale upon heating.

Dvorscek et al. (U.S. Pat. No. 4,802,995) discloses a method of decomposing the cyanide radical in cyanide-bearing wastes using heat treatment. The method is performed by introducing cyanide-bearing waste and water into a closed retort and heating the retort above a critical temperature.

Robey (U.S. Pat. No. 4,877,519) discloses a method for treating cyanide-containing waste water using a sufficiently high temperature and pressure to affect hydrolysis of cyanide in the waste water. The disclosed method utilizes a double heat exchange system for both influent and effluent streams of waste water.

Fischer et al. (U.S. Pat. No. 4,731,232) discloses a method for purifying gas wash waters containing hydrogen cyanide. The method involves controlled dosing of the waste with aqueous formaldehyde.

Other methods for treating cyanide waste have been developed utilizing biological material. For example, Timofeeva et al. (Soviet Union Patent 1468871) discloses degradation of cyanides in cyanide-containing waste using Pleurotus ostreatus fungi. The cyanide-degrading fungi are immobilized on lignin sludge or on a mixture of sawdust and aerosil and then exposed to the waste.

Kubota (Japanese Patent 1293195) discloses a method of treating cyanide-containing waste water using the bacteria *Bacillus subtillis* Kabata. Kubota reports that the bacteria may be added directly to the waste water or aggregated on a support such as active carbon or glass beads and then added to the waste.

Castaldi et al. (U.S. Pat. No 4,790,940) discloses a method of detoxifying cyanide-containing effluent involving a combination of chemical and biological treatment. The process disclosed employs chemical conversion with polysulfide to transform the free cyanide in the effluent to thiocyanate. The thiocyanates are then metabolized by the action of certain gram-negative chemolithotropic bacteria.

Some of the aforementioned methods are inadequate in detoxifying cyanide to safe levels and produce waste which is environmentally dangerous. Furthermore, some of the methods described above require special equipment and are labor intensive.

SUMMARY OF THE INVENTION

The present invention relates to a method for detoxifying cyanide waste using a reactive sugar which has aldose functionality. The method comprises mixing the cyanide waste with a sufficient quantity of reactive sugar to produce a detoxified waste material. Specifically, the sugar reacts with the cyanide in the waste to produce a material known as sugar acid. The sugar acid is non-toxic to humans, biodegradable, and environmentally safe.

The disclosed invention is advantageous in that it provides a relatively simple, inexpensive, and safe method for treating cyanide waste. In particular, this method reduces unnecessary hazards to the environment and to persons involved in the disposal and transport of cyanide waste. Further, the method can be carried out on a large or small scale and does not require specialized equipment.

DETAILED DESCRIPTION OF THE PREFERRED EMBODIMENTS

The phrase "cyanide waste," as used herein, contemplates any cyanide or cyanide-containing waste material. It should be further noted that the phrase "reactive sugar" as used in this application refers to D- and L- forms, which have aldose functionality.

The present invention provides a safe and relatively simple method for detoxifying cyanide waste using a reactive sugar. The reactive sugar is added to the cyanide waste in an amount sufficient to detoxify the quantity of cyanide present in the waste. It is believed that the sugar combines with the cyanide on a one-for-one molar basis. Therefore, the reactive sugar is preferably added in at least an equimolar fashion as determined by the amount of cyanide in the waste. However, it is most preferable to add an excess of reactive sugar, at least 10% excess, to provide more rapid and complete detoxification of the cyanide present in the waste.

The reactive sugar added to the cyanide waste is preferably a 3, 4, 5 or 6 carbon sugar, in either the D- or L- configuration, which has aldose functionality. Examples of such sugars include, but are not limited to, glucose, xylose, ribose, glyceraldehyde, erythrose, lactose, arabinose, fructose, and any combinations thereof. In a most preferred embodiment, glucose is added and mixed with the cyanide waste.

The reactive sugar may be added directly to the cyanide waste. The cyanide waste is preferably contained in a non-reactive vessel, such as a glass or stainless steel container. The present invention also contemplates that the cyanide waste be contained in other types of waste containment facilities, such as an industrial park waste pond. Alternatively, the reactive sugar may be absorbed or attached to a solid support and then contacted with the cyanide waste.

The cyanide waste and reactive sugar are then mixed for a sufficient time to ensure the complete reaction of the sugar with the cyanide. Preferably, the mixture is agitated continuously for about 24 hours at a temperature above 10° C., and preferably above 20° C. Sufficient moisture is required for the detoxification reaction to proceed. Accordingly, the cyanide waste should be in an aqueous phase. It is believed the lower the moisture content in the reaction mixture, the slower the detoxification reaction will proceed.

When reacted with excess xylose in an aqueous medium at ambient temperature, the half-life of the cyanide is about one minute. With glucose, the half-life is about 20 minutes. Every temperature increase of 10° C. typically doubles the reaction rate, shortening the half-life by a factor of two.

The exact mechanism by which a reactive sugar detoxifies cyanide waste is not fully understood. Basic chemical reactions involving cyanide (or cyanide salts) and sugars have been described, however. Serianni et al., *Carbohydrate Research*, 72:71–78 (1979) and Serianni et al., *J. Org. Chem.*, 45:3329–3341 (1980) describe the condensation of cyanide with aldoses to produce aldonitriles. Varma et al., *Carbohydrate Research*, 25:71–79 (1972) and Blazer et al., *J. Am. Chem. Soc.*, 102:5082–5085 (1980) describe mechanisms of cyanohydrin synthesis from the reaction of cyanide salts and arabinose.

It is believed that one possible mechanism of cyanide detoxification in cyanide waste may involve converting cyanide to non-toxic amides and acids through an aldonitrile intermediate. An illustration of such a reaction involving the reactive sugar, ribose, is shown below:

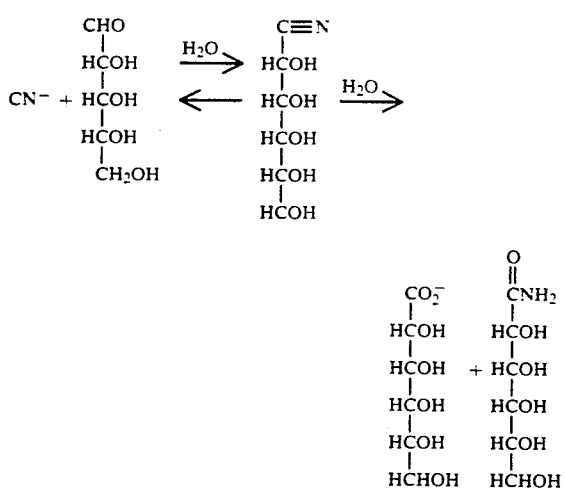

Further details of the invention will become apparent from the following examples, which illustrate the present invention.

EXAMPLE 1

A dilute solution (0.2M) of potassium cyanide was prepared with radiolabelled carbon ($C^{13}$). Solutions of the following sugars (2.0M) were prepared: fructose, glucose, arabinose, and ribose. Equal volumes of potassium cyanide and reducing sugar solution were mixed and analyzed continuously for $C^{13}$-labelled cyanide using nuclear magnetic resonance.

To accurately test for reactivity of the reducing sugar xylose, a sugar that appears to react with cyanide at a relatively fast reaction rate, a 4.0 M xylose solution was added to an equal portion of 0.4 M potassium cyanide solution and mixed by stirring. Aliquots of the reaction mixture were pipeted into tubes containing a maleic anhydride solution (10 g/100 ml, pH 1.0) and analyzed for $C^{13}$-labelled cyanide using nuclear magnetic resonance.

Data were tabulated for each reducing sugar. For each sugar, a half-life, or time required for half of the cyanide to be destroyed, was determined and reported below:

| Sugar | Cyanide Half-Life (25° C.) |
| --- | --- |
| Fructose | 63.9 minutes |
| Glucose (Dextrose) | 19.3 minutes |
| Arabinose | 4.2 minutes |
| Ribose | <4 minutes |
| Xylose | 1.0 minute |

This experiment shows the relative effectiveness of the five sugars for detoxifying cyanide waste. Any of the sugars could be used, but some would require longer reaction times than others.

EXAMPLE 2

Place a quantity of cyanide-containing waste water in a covered, non-reactive stainless steel vessel. Determine the amount of cyanide contained in the waste water by sampling the waste water and analyzing the sample by ion chromatography. Next, add an equimolar amount plus 10% of xylose directly to the waste water. Agitate the mixture in the stainless steel vessel continuously for 24 hours at room temperature.

EXAMPLE 3

Determine the amount of cyanide contained in the cyanide waste water of an industrial park waste pond by sampling the waste water and analyzing it by ion chromatography. Add xylose directly to the pond in an amount exceeding the molar quantity of cyanide present in the pond water. Mechanically agitate the waste water for several days to allow the sugar to react with the cyanide.

In summary, an inexpensive and safe method has been described for detoxifying cyanide waste. Although specific embodiments and examples have been described herein, it should be born in mind that these have been provided by way of explanation and illustration, and that the present invention is not limited thereby. Modifications that are within the ordinary skill in the art to make are considered to lie within the scope of the invention as defined by the following claims, including all equivalents.

We claim:

1. A method for detoxifying cyanide waste using a reactive sugar, comprising the steps of:
   providing cyanide waste-containing solution;
   adding xylose to said solution in an amount at least equimolar to the quantity of cyanide in said solution; and
   mixing the xylose with the solution for a sufficient time to detoxify the cyanide therein.

2. A method for detoxifying cyanide waste using a reactive sugar, comprising the steps of:
   providing cyanide waste-containing solution;
   sampling and analyzing said solution to determine the amount of cyanide in the solution;
   adding xylose to said solution in an amount exceeding the molar quantity of cyanide in the solution by at least 10%; and
   mixing the xylose with the solution at a temperature above 10° C. for a sufficient time to detoxify the cyanide therein.

* * * * *